United States Patent
Ryynänen

(10) Patent No.: US 7,342,573 B2
(45) Date of Patent: Mar. 11, 2008

(54) ELECTROSTRICTIVE POLYMER AS A COMBINED HAPTIC-SEAL ACTUATOR

(75) Inventor: Matti Ryynänen, Helsinki (FI)

(73) Assignee: Nokia Corporation (FI)

( * ) Notice: Subject to any disclaimer, the term of this patent is extended or adjusted under 35 U.S.C. 154(b) by 679 days.

(21) Appl. No.: 10/887,214

(22) Filed: Jul. 7, 2004

(65) Prior Publication Data

US 2006/0022952 A1 Feb. 2, 2006

(51) Int. Cl.
G06F 3/041 (2006.01)

(52) U.S. Cl. .................................... 345/173

(58) Field of Classification Search ............... 345/156, 345/157, 173–178; 715/701, 702; 178/18.01–18.09, 178/18.11
See application file for complete search history.

(56) References Cited

U.S. PATENT DOCUMENTS

| | | | | |
|---|---|---|---|---|
| 5,844,392 | A | 12/1998 | Peurach et al. | 318/568.17 |
| 5,999,168 | A | 12/1999 | Rosenberg et al. | 345/161 |
| 6,131,097 | A | 10/2000 | Peurach et al. | 707/102 |
| 6,184,868 | B1 | 2/2001 | Shahoian et al. | 345/161 |
| 6,281,651 | B1 | 8/2001 | Haanpaa et al. | 318/568.11 |
| 6,374,255 | B1 | 4/2002 | Peurach et al. | 707/102 |
| 6,396,232 | B2 | 5/2002 | Haanpaa et al. | 318/568.11 |
| 6,411,276 | B1 | 6/2002 | Braun et al. | 345/156 |
| 6,429,846 | B2 | 8/2002 | Rosenberg et al. | 345/156 |
| 6,433,771 | B1 | 8/2002 | Yocum et al. | 345/156 |
| 6,448,977 | B1 | 9/2002 | Braun et al. | 345/701 |
| 6,515,077 | B1 | 2/2003 | Su et al. | 525/276 |
| 6,563,487 | B2 | 5/2003 | Martin et al. | 345/156 |
| 7,119,798 | B2 * | 10/2006 | Yoshikawa et al. | 345/173 |
| 7,196,688 | B2 * | 3/2007 | Schena | 345/156 |
| 7,205,978 | B2 * | 4/2007 | Poupyrev et al. | 345/157 |
| 2004/0164971 | A1 * | 8/2004 | Hayward et al. | 345/179 |
| 2007/0013677 | A1 * | 1/2007 | Rosenberg et al. | 345/173 |

FOREIGN PATENT DOCUMENTS

| | | | |
|---|---|---|---|
| EP | 1544720 A1 * | 6/2005 | |
| EP | 1566728 A1 * | 8/2005 | |

OTHER PUBLICATIONS

Conducting Polymer Actuators (Artificial muscles), from the Internet.
Polymer actuator technology, from the Internet.

* cited by examiner

Primary Examiner—Alexander Eisen
Assistant Examiner—Chanelle N Mack

(57) ABSTRACT

This invention describes a method for a haptic (tactile) feedback to a user of an electronic device having a touch display (screen) by utilizing an electrostrictive polymer as a combined haptic-seal actuator attached to the touch screen. In addition, the combined seal-actuator also makes a shock absorber. The electrostrictive polymer is a suitable material for haptic-seal-shock absorbing actuator because of its robustness and large stroke.

34 Claims, 5 Drawing Sheets

ELECTROSTRICTIVE POLYMER AS A COMBINED HAPTIC-SEAL ACTUATOR

TECHNICAL FIELD

This invention generally relates to haptic applications in electronic devices and more specifically to providing a haptic feedback to a user of an electronic device having a touch display (screen) by utilizing an electrostrictive polymer as a combined haptic-seal actuator attached to the screen.

BACKGROUND ART

An active tactile (haptic) feedback is a desirable property for electronic products with touch screens. Presently available actuators are not quite adequate for providing such haptic feedback in the electronic devices with touch screens. Especially this relates to portable communication devices, requiring small dimensions and low operating voltage of such actuators. These conditions are not met by, e.g., piezo actuators requiring high operating voltages, or by the electromagnetic actuators which are bulky. Moreover, minimizing energy consumption requires leaving an air gap between a cover and a display (screen) if piezo or electromagnetic actuators are used for tactile feedback which prevents proper sealing of the screen in the electronic devices. To resist water and dust coming to the electronic device when the screen moves is a necessity in practice. In theory it is possible to make a separate flexible sealing with piezo and electromagnetic actuators but this will potentially reduce touch areas of the screen and will complicate the design.

Electrostrictive polymers offer energy efficient actuation with much larger strain than other technologies mentioned above. The electrostrictive polymers change shape tens of times more than piezo materials which comparable voltages applied. Furthermore, electrostrictive polymers have a high flexibility, elasticity, and can form complicated shapes. A combination of these properties creates an opportunity for combining sealing, gluing and shock absorbing functions with tactile actuation when electrostrictive polymers are used.

DISCLOSURE OF THE INVENTION

The object of the present invention is to provide a methodology for a haptic feedback to a user of an electronic device having a touch display (screen) by utilizing an electrostrictive polymer as a combined haptic-seal actuator attached to the touch screen.

According to a first aspect of the invention, a method for providing a haptic feedback signal to a user of an electronic device having a screen using an electrostrictive polymer actuator as a seal attached and optionally glued to the screen over edges of the screen, comprises the steps of: applying a manipulation signal to a predetermined location on the screen of the electronic device by the user, while maintaining the seal intact, to communicate a predetermined command to the electronic device; generating an actuator switching signal by a detector/amplifier/controller module in response to the manipulation signal, and providing the actuator switching signal to an actuator switching power supply; generating an actuator signal by the actuator switching power supply in response to the actuator switching signal, and providing the actuator signal to the electrostrictive polymer actuator; and changing a shape of the electrostrictive polymer actuator in response to the actuator signal, thus causing a movement of the screen attached and optionally glued to the electrostrictive polymer actuator wherein the screen movement provides the haptic feedback signal to the user regarding a successful transfer of the command to the electronic device.

According further to the first aspect of the invention, the electrostrictive polymer actuator may be maintained intact as a seal for any position of the screen during application of the actuator signal.

Further according to the first aspect of the invention, the electrostrictive polymer actuator may be also used as a shock absorber in the electronic device.

Still further according to the first aspect of the invention, the predetermined location may be an icon. Still further, the manipulation signal may be provided by a mechanical touch of the user using a stylus or a finger.

According further to the first aspect of the invention, the actuator switching signal may be generated only if the manipulation signal provides a mechanical force to the predetermined location on the screen that exceeds a predetermined threshold force level.

According still further to the first aspect of the invention, the actuator signal may be a DC voltage signal of a predetermined polarity which, when applied, may change the shape of the electrostrictive polymer actuator in a predetermined way which moves a surface of the screen in a predetermined direction relative to the surface of the screen, thus creating a haptic feedback to the user. Yet still further, the predetermined direction may be upward or downward relative to the surface of the screen.

According further still to the first aspect of the invention, the actuator signal may be a voltage pulsed signal which, when applied, may change the shape of the electrostrictive polymer actuator in a predetermined cyclic manner which moves a surface of the screen in a predetermined direction relative to the surface of the screen during application of the voltage pulses thus creating a vibration haptic feedback signal to the user. Still further, the predetermined direction may be upward or downward relative to the surface of the screen.

According yet further still to the first aspect of the invention, the electrostrictive polymer actuator may have a conical shape, or a rectangular shape. Further still, the electrostrictive polymer actuator may comprise two, top and bottom, electrostrictive polymer actuators and each of the two actuators may be attached separately to a top surface of the screen and to a bottom surface of the screen, respectively, and a corresponding one actuator signal of two separate actuator signals, generated by the actuator switching power supply, may be applied to the top electrostrictive polymer actuator or to the bottom polymer actuator. Yet still further, the electrostrictive polymer actuator may be divided into N sections electrically isolated from each other and the actuator signal may be applied to one or more selected sections out of the N sections, wherein N is an integer of at least a value of two.

Yet still further according to the first aspect of the invention, a selected area of the electrostrictive polymer actuator is glued to a screen support of the electronic device. Further still, a further selected area of the electrostrictive polymer actuator may be glued to the screen.

Still yet further according to the first aspect of the invention, the electronic device may be a wireless portable device, a mobile communication device or a mobile phone.

According to a second aspect of the invention, an electronic device for providing a haptic feedback signal to a user, comprises: a screen, responsive to a manipulation signal applied by the user to a predetermined location on the screen of the electronic device, while maintaining the seal intact, to communicate a predetermined command to the electronic device; an electrostrictive polymer actuator attached and optionally glued to the screen over edges of the screen and used as a seal; detector/amplifier/controller module, responsive to the manipulation signal, for providing an actuator switching signal; and an actuator switching power supply, responsive to the actuator switching signal, for providing an actuator signal to the electrostrictive polymer actuator, wherein the actuator signal changes a shape of the electrostrictive polymer actuator thus causing a movement of the screen attached and optionally glued to the electrostrictive polymer actuator, wherein the screen movement provides the haptic feedback signal to the user regarding a successful transfer of the command to the electronic device.

According further to the second aspect of the invention, the electrostrictive polymer actuator may be maintained intact as a seal for any position of the screen during application of the actuator signal.

Further according to the second aspect of the invention, the electrostrictive polymer actuator may be also used as a shock absorber in the electronic device.

Still further according to the second aspect of the invention, the predetermined location may be an icon. Still further, the manipulation signal may be provided by a mechanical touch of the user using a stylus or a finger.

According further to the second aspect of the invention, the actuator switching signal may be generated only if the manipulation signal provides a mechanical force to the predetermined location on the screen that exceeds a predetermined threshold force level.

According still further to the second aspect of the invention, the actuator signal may be a DC voltage signal of a predetermined polarity which, when applied, may change the shape of the electrostrictive polymer actuator in a predetermined way which moves a surface of the screen in a predetermined direction relative to the surface of the screen, thus creating a haptic feedback to the user. Yet further, the predetermined direction may be upward or downward relative to the surface of the screen.

According further still to the second aspect of the invention, the actuator signal may be a voltage pulsed signal which, when applied, may change the shape of the electrostrictive polymer actuator in a predetermined cyclic manner which moves a surface of the screen in a predetermined direction relative to the surface of the screen during application of the voltage pulses thus creating a vibration haptic feedback signal to the user. Yet further still, the predetermined direction may be upward or downward relative to the surface of the screen.

Yet still further according to the second aspect of the invention, the electrostrictive polymer actuator may have a conical shape, or a rectangular shape. Still further, the electrostrictive polymer actuator may comprise two, top and bottom, electrostrictive polymer actuators and each of the two actuators may be attached separately to a top surface of the screen and to a bottom surface of the screen, respectively, and a corresponding one actuator signal of two separate actuator signals, generated by the actuator switching power supply, may be applied to the top electrostrictive polymer actuator or to the bottom polymer actuator. Yet further still, the electrostrictive polymer actuator may be divided into N sections electrically isolated from each other and the actuator signal may be applied to one or more selected sections out of the N sections, wherein N is an integer of at least a value of two.

According yet further still to the second aspect of the invention, a selected area of the electrostrictive polymer actuator may be glued to a screen support of the electronic device. Yet further still, a further selected area of the electrostrictive polymer actuator may be glued to the screen.

Still yet further according to the second aspect of the invention, the electronic device may be a wireless portable device, a mobile communication device or a mobile phone. Still further, the detector/amplifier/controller module and the actuator switching power supply may be combined in one module.

According to a third aspect of the invention, a method for providing a haptic feedback signal to a user of an electronic device having a screen using an electrostrictive polymer actuator as a seal attached and optionally glued to the screen over edges of the screen, comprises the steps of: applying a manipulation signal in a form of a mechanical touch to a predetermined location on the screen of the electronic device by the user, while maintaining the seal intact, to communicate a predetermined command to the electronic device; and changing a shape of the electrostrictive polymer actuator in response to the manipulation signal if the predetermined command is successfully transferred, thus causing a movement of the screen attached and optionally glued to the electrostrictive polymer actuator wherein the screen movement provides the haptic feedback signal to the user regarding a successful transfer of the command to the electronic device.

BRIEF DESCRIPTION OF THE DRAWINGS

For a better understanding of the nature and objects of the present invention, reference is made to the following detailed description taken in conjunction with the following drawings, in which.

BEST MODE FOR CARRYING OUT THE INVENTION

The present invention provides a new methodology for a haptic (tactile) feedback to a user of an electronic device having a touch display (screen) by utilizing an electrostrictive polymer as a combined haptic-seal actuator attached to the touch screen, according to the present invention. In addition the combined seal-actuator also makes a shock absorber. The electrostrictive polymer is a suitable material for haptic-seal-shock absorbing actuator because of its robustness and large stroke.

When the user touches, e.g., an icon on the touch screen, the touch is detected with a separate detector circuit which triggers an application of an electric voltage to the actuator-seal material made of the electrostrictive polymer. This causes the electrostrictive polymer to deform (in a variety of ways described below), and push the attached screen in a predetermined direction (again in a variety of ways as described below) such that the user can feel that movement (e.g., pressure, vibration, wobbling, rocking, etc.). It is noted that the electrostrictive polymer seal-actuator maintains the seal intact for any position of the screen during its movement according to the present invention.

Figure 1:
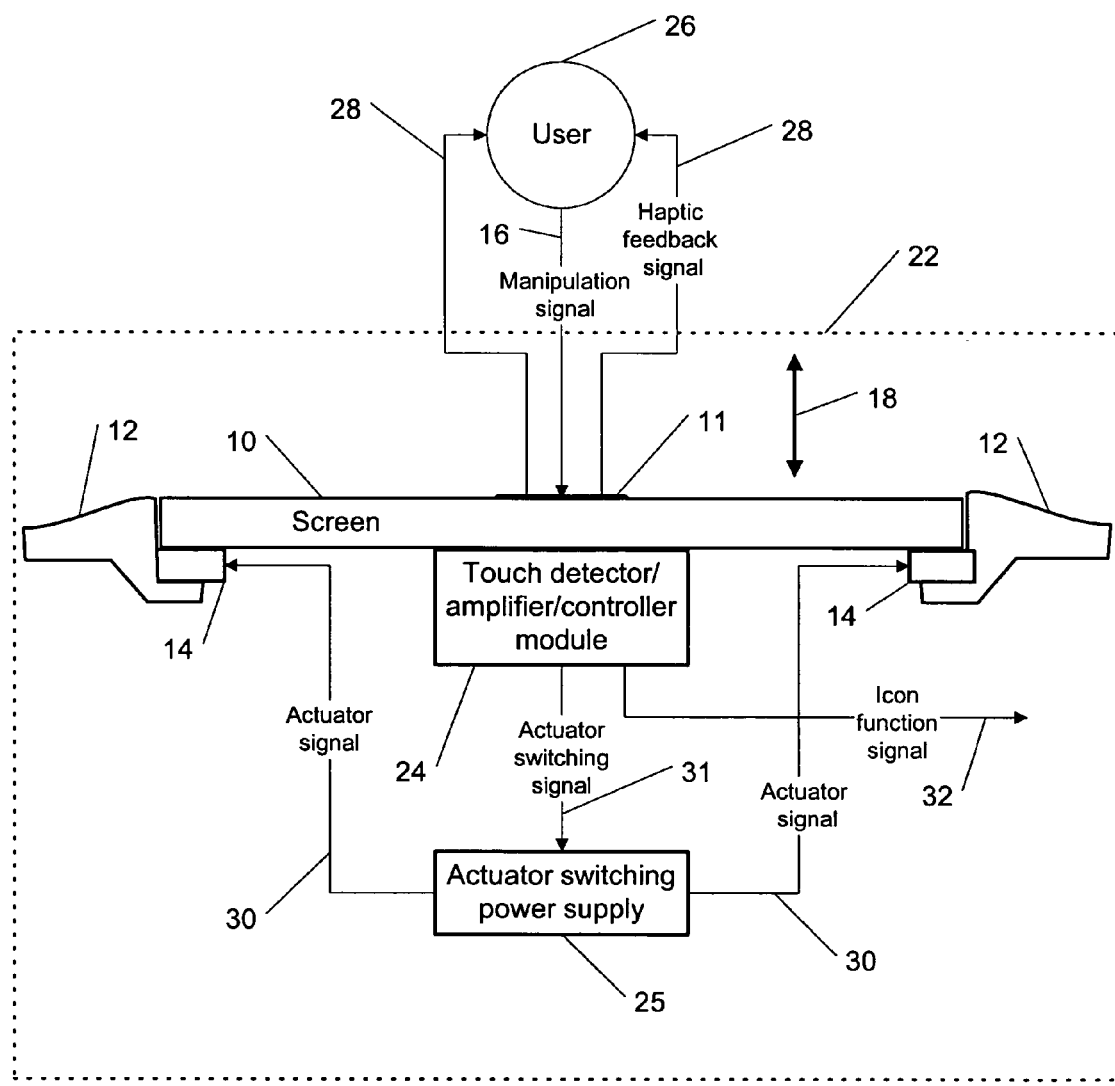
FIG. 1 shows a block diagram of an electronic device having a screen for providing a haptic feedback signal to a user utilizing an electrostrictive polymer seal-actuator attached and optionally glued to the screen, according to the present invention.

FIG. 1 shows one example among others of a block diagram of an electronic device 22 having a touch screen 10 for providing a haptic feedback signal 28 to a user 26 utilizing an electrostrictive polymer actuator 14 attached and optionally glued to the screen 10 over all edges of the screen 10, acting as a seal, according to the present invention. As shown in FIG. 1, there is a screen support 12 to which the electrostrictive polymer actuator 14 is also attached and optionally glued for providing said seal.

A manipulation signal 16 (e.g., a mechanical touch provided by a stylus or a user finger) is applied to a predetermined location 11 on the screen 10 of the electronic device 22 by the user 26, while maintaining said seal intact, to communicate a predetermined command to the electronic device 22. The predetermined location can be, e.g., an icon and can be at any location on the screen 10. If a detector/amplifier/controller module 24 detects the manipulation signal 16, it generates an actuator switching signal 31 in response to said manipulation signal 16, and provides said actuator switching signal 31 to an actuator switching power supply 25. It is noted that the actuator switching signal 31 is generated only if said manipulation signal 16 provides a mechanical force to said predetermined location 11 on the screen 10 that exceeds a predetermined threshold force level.

The actuator switching power supply 25 generates an actuator signal 30 in response to said actuator switching signal 31 and provides said actuator signal 30 to the electrostrictive polymer actuator 14. In an alternative solution, according to the present invention, modules 24 and 25 can be combined in one module.

The electrostrictive polymer actuator 14 changes its shape in response to said actuator signal 30 thus causing a movement of the screen 10 attached and optionally glued to said electrostrictive polymer actuator 14 while maintaining said seal intact, which is an important feature of the present invention. Thus said screen movement provides the haptic feedback signal 28 to the user 26 regarding a successful transfer of the command to the electronic device 22. The important feature of the present invention is that said seal is maintained intact for any position of the screen 10.

The actuator signal 30 is a DC voltage signal of a predetermined polarity which, when applied, changes the shape of said electrostrictive polymer actuator 14 in a predetermined way which moves a surface of said screen 10 in a predetermined direction (e.g., upward or downward) relative to the surface of the screen 10, thus creating a haptic feedback to the user 26. In an alternative implementation the actuator signal 30 can be a voltage pulsed signal which, when applied, changes the shape of said electrostrictive polymer actuator 14 in a predetermined cyclic manner which moves a surface of said screen 10 in a predetermined direction (again, e.g., upward or downward) relative to the surface of the screen 10 during application of said voltage pulses thus creating a vibration haptic feedback signal to the user 26.

Figure 2:
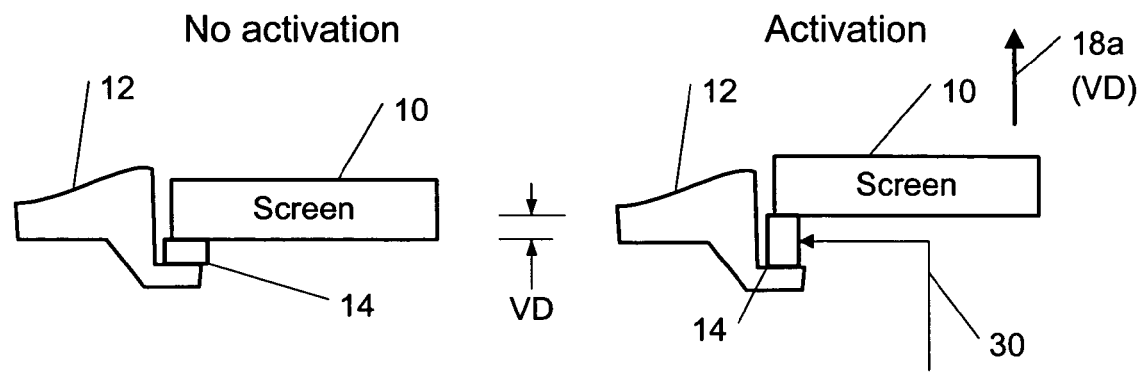
FIG. 2 shows an example of an operation (without actuation and with actuation) of an electrostrictive polymer seal-actuator providing a haptic feedback signal, according to the present invention.

FIG. 2 shows one example among others of an operation without actuation (shown on the left) and with actuation (shown on the right) of the electrostrictive polymer actuator 14 providing a haptic feedback signal, according to the present invention. With no actuator signal 30 applied (shown on the left), the electrostrictive polymer actuator 14 has an elongated rectangle shape in a horizontal direction. With the actuator signal 30 applied (shown on the right), the electrostrictive polymer actuator 14 has an elongated rectangle shape in a vertical direction 18 (the size change is dramatically exaggerated for demonstration purposes), thus providing a vertical displacement (VD) of the screen 10 felt by the user 26 as a haptic (tactile) feedback.

Figure 3:
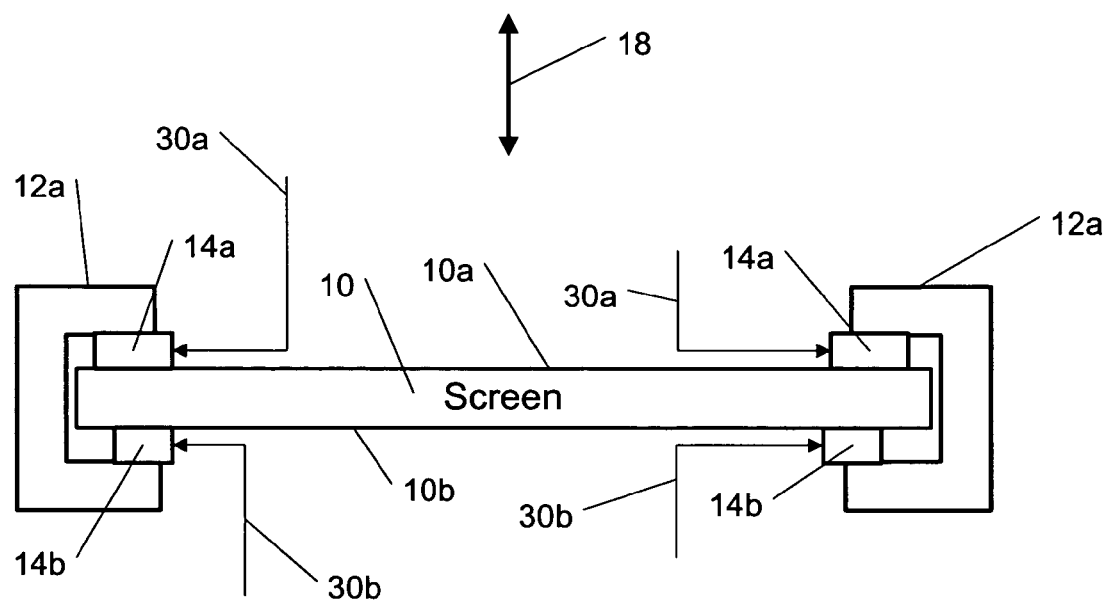
FIG. 3 shows an example of mounting a screen (which is a part of an electronic device) for providing a haptic feedback signal to a user utilizing two electrostrictive polymer seal-actuators each of which is separately attached and optionally glued to one of two sides of the screen, according to the present invention.

FIG. 3 shows an alternative example among others of mounting the screen 10 for providing a haptic feedback signal to a user utilizing two electrostrictive polymer actuators 14a and 14b each of which is separately attached (i.e., sealed) and optionally glued to one of two sides of the screen 10 and to a screen support 12a, according to the present invention. Each actuator 14a or 14b acts as a single actuator 14 described above and each of said two actuators is separately attached to a top surface 10a of the screen 10 and to a bottom surface 10b of said screen 10, respectively. In this scenario the the actuator switching power supply 25 can generate one actuator signal 30a applied to a top electrostrictive polymer actuator 14a or another actuator signal 30b applied to the bottom polymer actuator 14b. In this case both actuators 14a and 14b can make activation of the screen 10 in both upward and downward directions. The bottom activator 14b provides a firm support in case the screen 10 suffers a heavy stylus force or an accidental impact. The upper actuator 14a can provide protection from penetration of dust, water, etc. Two-actuator construction can be used without gluing. Also, in an alternative implementation, one of the two actuators 14a and 14b can be used only as a seal.

Figure 4:
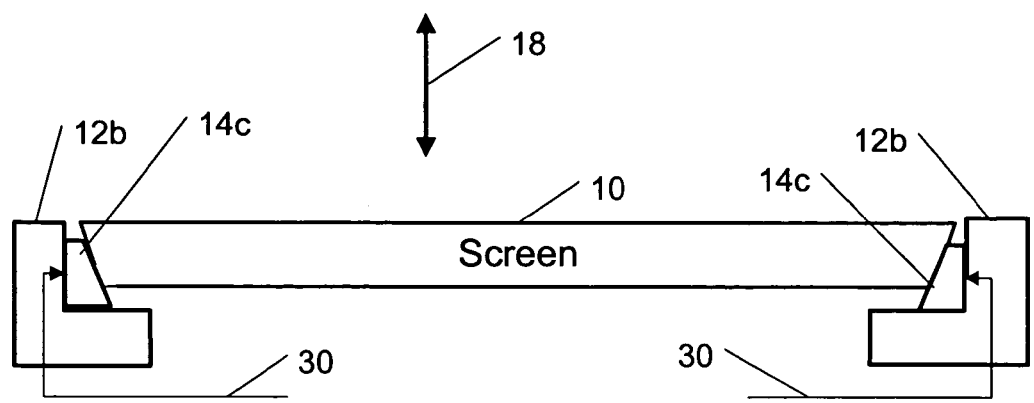
FIG. 4 shows an example of mounting a screen (which is a part of an electronic device) for providing a haptic feedback signal to a user utilizing an electrostrictive polymer actuator of a conical shape attached and optionally glued to the screen, according to the present invention.

FIG. 4 shows yet another example among others of mounting the screen 10 for providing a haptic feedback signal to a user utilizing a conical shape electrostrictive polymer actuator 14c attached (i.e., sealed) and optionally glued to the screen 10, according to the present invention. The conical shape electrostrictive polymer actuator 14c provides a movement amplification compared to the rectangular shape actuator 14 because an actuator strain can provide larger movement of the screen 10 in the vertical direction with a cone angle of less than 45°. The conical shape electrostrictive polymer actuator 14c can also provide a better dust/water protection than the rectangular actuator 14.

Figure 5:
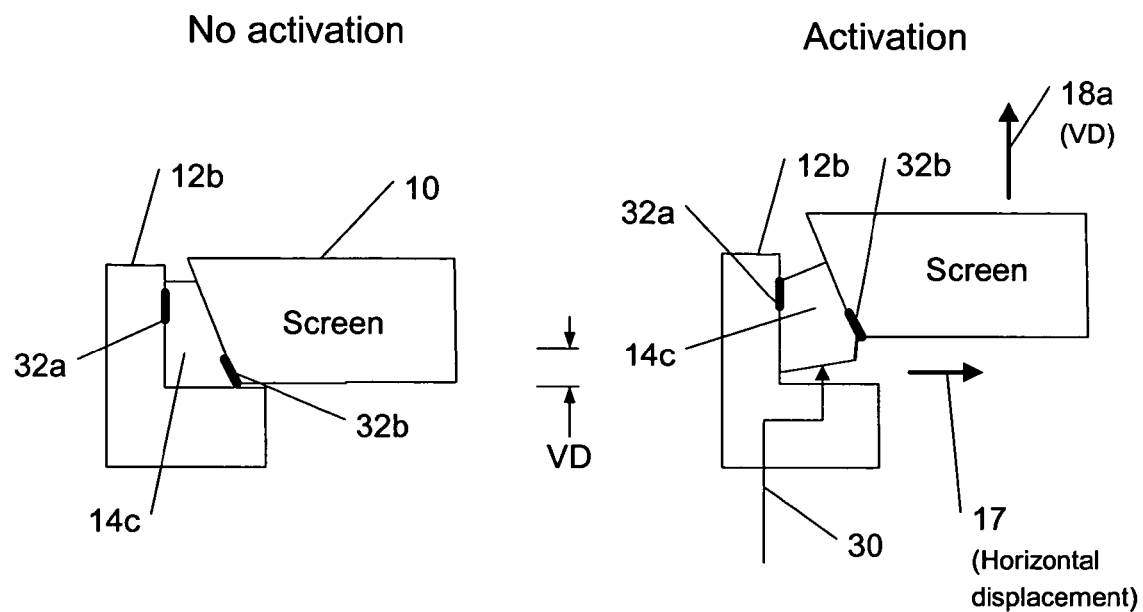
FIG. 5 shows an example of an operation (without actuation and with actuation) of an electrostrictive polymer seal-actuator of a conical shape providing a haptic feedback, according to the present invention.

FIG. 5 shows a further example among others of an operation without actuation (shown on the left) and with actuation (shown on the right) of the conical shape electrostrictive polymer actuator 14c for providing a haptic feedback, according to the present invention. The conical shape electrostrictive polymer actuator 14c can be optionally glued to the screen 10 (see area 32b) and to the screen support 12

(see area 32a). When the actuator 14c horizontal motion 17 to the right (the actuator lengthens in the horizontal direction) is transformed into vertical upward motion 18a of the screen 10 as described above, the conical space (with the conical angle of less than 45°) can make the screen 10 move upward vertically more than the actuator 14c horizontal motion 17 to the right which provides said motion amplification.

Figure 6:
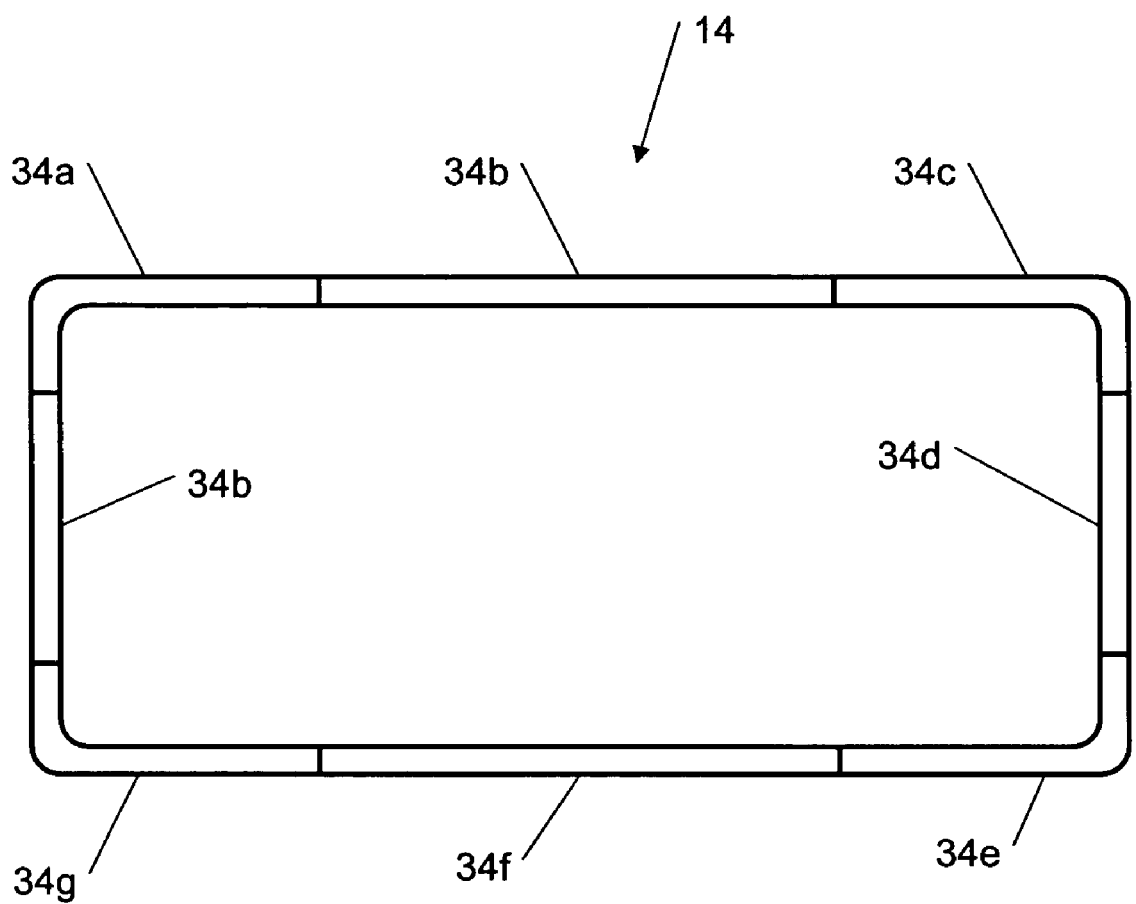
FIG. 6 shows an example of electrostrictive polymer seal-actuator divided into N sections electrically isolated from each other, according to the present invention.

FIG. 6 shows another example among others of an electrostrictive polymer actuator 14 divided into N=8 (in general, N is an integer of at least a value of two.) sections 34a, 34b, 34c, 34d, 34e, 34f, and 34g, electrically isolated from each other, according to the present invention.

The actuator signal 30 can be applied to any combination of selected sections out of said N sections causing various modes of motion of the screen 10. Thus the display 10 can be tilted, rocked in one plane or wobbled. The minimum number of differently driven sections for wobbling is three and the minimum number of differently driven sections is two if only one tilt or rocking is wanted.

Figure 7:
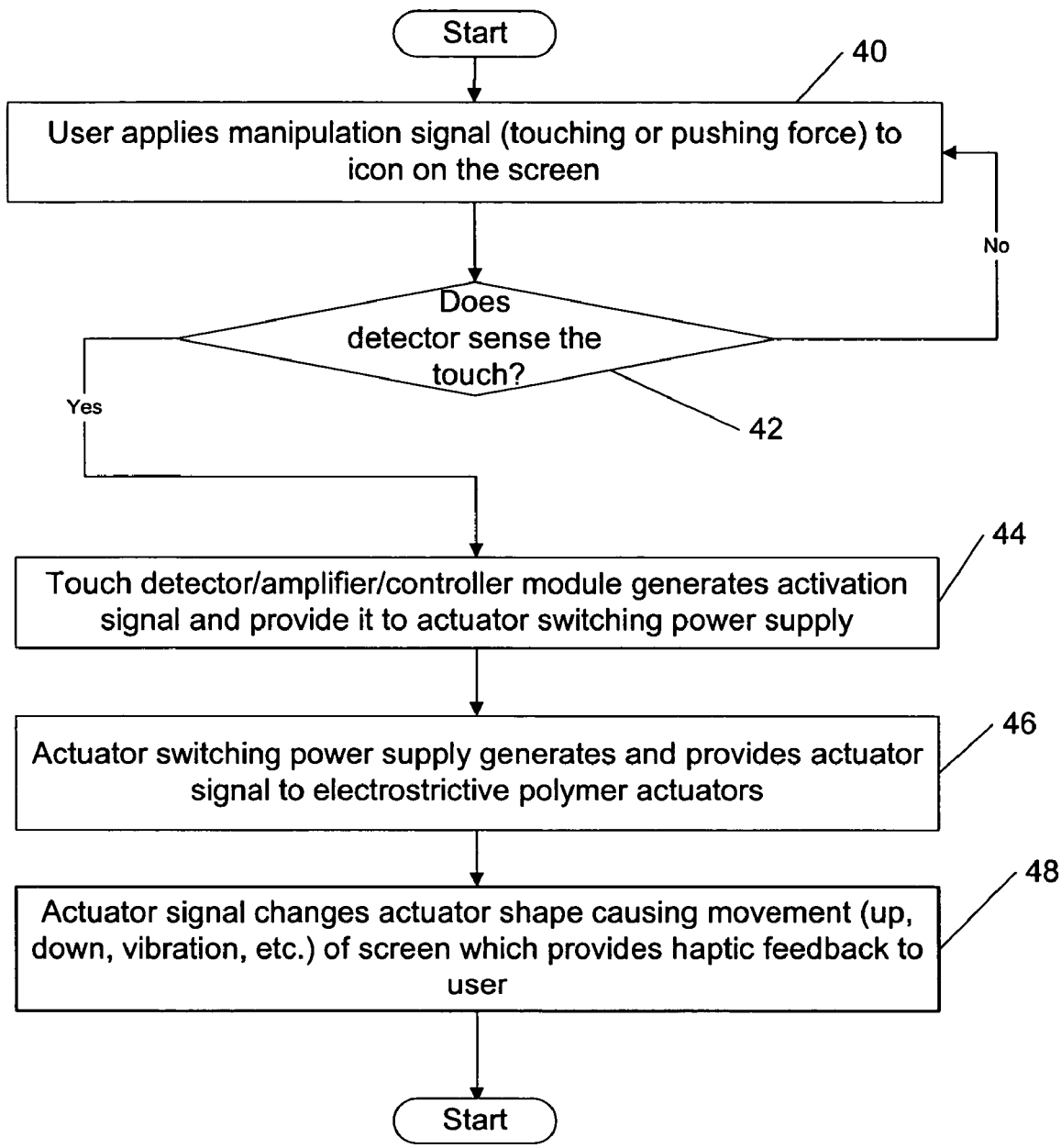
FIG. 7 shows a flow chart demonstrating an operation of an electronic device having a screen for providing a haptic feedback signal to a user utilizing an electrostrictive polymer seal-actuator attached and optionally glued to the screen, according to the present invention.

FIG. 7 shows a flow chart for operation of an electronic device 22 having the screen 10 for providing a haptic feedback signal 28 to the user 26 utilizing the electrostrictive polymer actuator 14 attached and optionally glued to the screen 10 over all edges of the screen 10, acting as a seal, according to the present invention.

The flow chart of FIG. 7 represents only one possible scenario among many others. In a method according to the present invention, in a first step 40, the user 26 applies a manipulation signal 16 (e.g., a mechanical touch provided by a stylus or a user finger) to the predetermined location 11 on the screen 10 of the electronic device 22, while maintaining said seal intact, to communicate a predetermined command to the electronic device 22. In a next step 42, it is determined whether the touch (the signal 16) is detected by the detector/amplifier/controller module 24. If that is not the case, the process goes back to step 40. However, if the touch is detected by the detector/amplifier/controller module 24, in a next step 44, the detector/amplifier/controller module 24 generates the actuator switching signal 31 and provides said actuator switching signal 31 to the actuator switching power supply 25. In a next step 46, the actuator switching power supply 25 generates an actuator signal 30 and provided said actuator signal 30 to the electrostrictive polymer actuator 14. Finally, in a next step 48, the electrostrictive polymer actuator 14 changes its shape in response to said actuator signal 30 thus causing a movement of the screen 10 attached and optionally glued to said electrostrictive polymer actuator 14 while maintaining said seal intact, and said screen movement provides said haptic feedback signal 28 to the user 26 regarding successful transfer of said command to the electronic device 22.

What is claimed is:

1. A method, comprising:
    applying a manipulation signal to a predetermined location on a screen of an electronic device, while maintaining a seal intact, to communicate a predetermined command to said electronic device, wherein an electrostrictive polymer actuator is configured to form said seal and is attached or glued to said screen over edges of the screen;
    generating an actuator switching signal by a detector/amplifier/controller module in response to said manipulation signal, and providing said actuator switching signal to an actuator switching power supply;
    generating an actuator signal by the actuator switching power supply in response to said actuator switching signal, and providing said actuator signal to the electrostrictive polymer actuator; and
    changing a shape of said electrostrictive polymer actuator in response to said actuator signal, for causing a movement of the screen attached or glued to said electrostrictive polymer actuator, wherein said screen movement is for providing a haptic feedback signal regarding a successful transfer of said command to the electronic device.

2. The method of claim 1, wherein said electrostrictive polymer actuator is maintained intact as a seal for any position of the screen during application of the actuator signal.

3. The method of claim 1, wherein said electrostrictive polymer actuator is also used as a shock absorber in said electronic device.

4. The method of claim 1, wherein said predetermined location is an icon.

5. The method of claim 1, wherein said manipulation signal is provided by a mechanical touch using a stylus or a finger.

6. The method of claim 1, wherein said actuator switching signal is generated only if said manipulation signal provides a mechanical force to said predetermined location on the screen that exceeds a predetermined threshold force level.

7. The method of claim 1, wherein said actuator signal is a DC voltage signal of a predetermined polarity for changing the shape of said electrostrictive polymer actuator in a predetermined way for providing a movement of a surface of said screen in a predetermined direction relative to the surface of the screen, for creating a haptic feedback.

8. The method of claim 7, wherein said predetermined direction is upward or downward relative to said surface of the screen.

9. The method of claim 1, wherein said actuator signal is a voltage pulsed signal which, when applied, is configured to change the shape of said electrostrictive polymer actuator in a predetermined cyclic manner for providing a movement of a surface of said screen in a predetermined direction relative to the surface of the screen during application of said voltage pulses for creating a vibration haptic feedback signal.

10. The method of claim 9, wherein said predetermined direction is upward or downward relative to said surface of the screen.

11. The method of claim 1, wherein said electrostrictive polymer actuator has a conical shape, or a rectangular shape.

12. The method of claim 1, wherein said electrostrictive polymer actuator comprises two, top and bottom, electrostrictive polymer actuators and each of said two actuators is attached separately to a top surface of said screen and to a bottom surface of said screen, respectively, and a corresponding one actuator signal of two separate actuator signals, generated by the actuator switching power supply, is applied to the top electrostrictive polymer actuator or to the bottom polymer actuator.

13. The method of claim 1, wherein a selected area of said electrostrictive polymer actuator is glued to a screen support of said electronic device.

14. The method of claim 1, wherein a further selected area of said electrostrictive polymer actuator is glued to the screen.

15. The method of claim 1, wherein said electronic device is a wireless portable device, a mobile communication device or a mobile phone.

16. The method of claim 1, wherein said electrostrictive polymer actuator is divided into N sections electrically isolated from each other and said actuator signal is applied to one or more selected sections out of said N sections, wherein N is an integer of at least a value of two.

17. An electronic device comprising:
a screen, responsive to a manipulation signal applied to a predetermined location on the screen of said electronic device, while maintaining a seal intact, to communicate a predetermined command to said electronic device;
an electrostrictive polymer actuator configured to form said seal and attached or glued to said screen over the edges of the screen and used as a seal;
detector/amplifier/controller module, responsive to said manipulation signal, configured to provide an actuator switching signal; and
an actuator switching power supply, responsive to said actuator switching signal, for providing configured to provide an actuator signal to the electrostrictive polymer actuator, wherein said actuator signal is for changing a shape of said electrostrictive polymer actuator for causing a movement of the screen attached or glued to said electrostrictive polymer actuator, wherein said screen movement is for providing a haptic feedback signal regarding a successful transfer of said command to the electronic device.

18. The electronic device of claim 17, wherein said electrostrictive polymer actuator is maintained intact as a seal for any position of the screen during application of the actuator signal.

19. The electronic device of claim 17, wherein said electrostrictive polymer actuator is also used as a shock absorber in the electronic device.

20. The electronic device of claim 17, wherein said predetermined location is an icon.

21. The electronic device of claim 17, wherein said manipulation signal is provided by a mechanical touch using a stylus or a finger.

22. The electronic device of claim 17, wherein said detector/amplifier/controller module is configured to generate said actuator switching signal only if said manipulation signal provides a mechanical force to said predetermined location on the screen that exceeds a predetermined threshold force level.

23. The electronic device of claim 17, wherein said actuator signal is a DC voltage signal of a predetermined polarity, which changes the shape of said electrostrictive polymer actuator in a predetermined way for moving a surface of said screen in a predetermined direction relative to the surface of the screen, for creating a haptic feedback to a user.

24. The electronic device of claim 23, wherein said predetermined direction is upward or downward relative to said surface of the screen.

25. The electronic device of claim 17, wherein said actuator signal is a voltage pulsed signal, which changes the shape of said electrostrictive polymer actuator in a predetermined cyclic manner for providing a movement of a surface of said screen in a predetermined direction relative to the surface of the screen during application of said voltage pulses for creating a vibration haptic feedback signal.

26. The electronic device of claim 25, wherein said predetermined direction is upward or downward relative to said surface of the screen.

27. The electronic device of claim 17, wherein said electrostrictive polymer actuator has a conical shape, or a rectangular shape.

28. The electronic device of claim 17, wherein said electrostrictive polymer actuator comprises two, top and bottom, electrostrictive polymer actuators and each of said two actuators is attached separately to a top surface of said screen and to a bottom surface of said screen, respectively, and said actuator switching power supply is configured to generate two separate actuator signals, and to apply a corresponding one actuator signal of said two separate actuator signals to the top electrostrictive polymer actuator or to the bottom polymer actuator.

29. The electronic device of claim 17, wherein a selected area of said electrostrictive polymer actuator is glued to a screen support of said electronic device.

30. The electronic device of claim 17, wherein a further selected area of said electrostrictive polymer actuator is glued to the screen.

31. The electronic device of claim 17, wherein said electronic device is configured for wireless communications.

32. The electronic device of claim 17, wherein said electrostrictive polymer actuator is divided into N sections electrically isolated from each other and said actuator signal is applied to one or more selected sections out of said N sections, wherein N is an integer of at least a value of two.

33. The electronic device of claim 17, wherein the detector/amplifier/controller module and the actuator switching power supply are combined in one module.

34. A method comprising:
applying a manipulation signal in a form of a mechanical touch to a predetermined location on a screen of an electronic device, while maintaining a seal intact, to communicate a predetermined command to said electronic device, wherein an electrostrictive polymer actuator is configured to form said seal and is attached or glued to said screen over the edges of the screen; and
changing a shape of said electrostrictive polymer actuator in response to the manipulation signal if said predetermined command is successfully transferred, causing a movement of the screen attached or glued to said electrostrictive polymer actuator wherein said screen movement provides said haptic feedback signal to a user regarding a successful transfer of said command to the electronic device.

* * * * *